Nov. 11, 1969  D. A. WORDEN  3,477,463
VALVE STRUCTURE AND CONTROLLER OPERATED THEREBY
Filed May 8, 1967
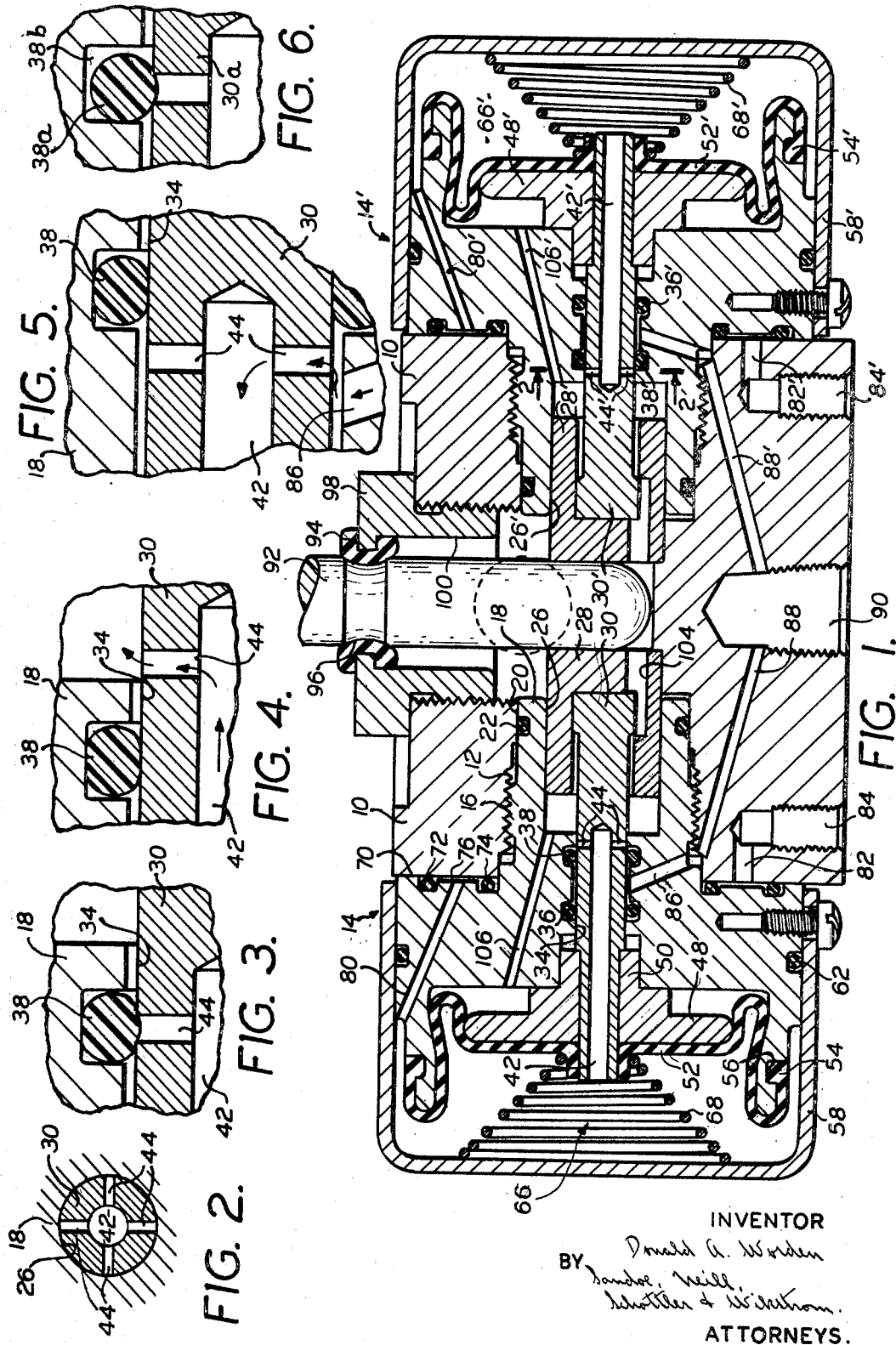
INVENTOR
Donald A. Worden
BY Sandoe, Neill,
Schottler & Wirstrom.
ATTORNEYS.

United States Patent Office 3,477,463
Patented Nov. 11, 1969

3,477,463
VALVE STRUCTURE AND CONTROLLER OPERATED THEREBY
Donald A. Worden, Pompton Plains, N. J., assignor to Marotta Valve Corporation, Boonton, N.J., a corporation of New Jersey
Filed May 8, 1967, Ser. No. 636,794
Int. Cl. F16k 31/145; F17d 3/02
U.S. Cl. 137—495                          10 Claims

ABSTRACT OF THE DISCLOSURE

A slide valve has a stem that slides axially in a sealing ring, preferably an O-ring. Radial openings communicate with a passage extending axially within the stem. Movement of the radial openings to different sides of the O-ring pressurizes or vents the passage selectively. The O-ring is wider than the radial passages for a third condition where it closes them. A manual actuator moves the stem against pressure in a sensing chamber so that resistance to movement of the actuator handle can be "felt."

Brief description of the invention

This invention relates to an improved slide valve which has an axially movable stem with radial ports opening through the circumference of the stem and communicating with an axially extending passage in the stem and which opens through one end of the stem. A single radial port can be employed, but it is preferable to have a plurality of ports at angularly spaced locations around the circumference of the stem so that a greater cross section for fluid flow is obtained without increasing the axial length of the ported portion of the stem circumference.

The stem slides in a sealing ring, preferably an O-ring, which closes the ports when they are within the ring; and the ports are put into communication with a pressurized clearance, or a vented clearance, on opposite sides of the ring as the ports are selectively moved axially from one side of the ring to the other.

The invention also includes a combination of the valve with manual actuating means including an operator-actuated element that moves the valve in combination with a pressure sensor which opposes the movement so that the operator can feel the resistance of the fluid pressure which is controlled by the valve. Pressure must be maintained by the operator to keep the valve in position to supply the pressure fluid. The combination is intended primarily for remote control equipment but it has other uses.

Other objects, features and advantages of the invention will appear or be pointed out as the description proceeds.

Brief description of the drawing

In the drawing, forming a part hereof, in which like reference characters indicate corresponding parts in all the views:

FIGURE 1 is a sectional view through a manually actuated controller embodying the combination of this invention;

FIGURE 2 is an enlarged fragmentary, sectional view taken on the line 2—2 of FIGURE 1;

FIGURE 3 is a greatly enlarged fragmentary view of part of the structure shown in FIGURE 1, but with the valve in a different position from that of FIGURE 1;

FIGURES 4 and 5 are enlarged fragmentary views showing a portion of the structure of FIGURE 1 and illustrating the flow of fluid with the valve in different positions; and FIGURE 6 is a fragmentary sectional view showing a modified construction for the valve.

Detailed description of the invention

FIGURE 1 shows a block constituting a housing 10 with a threaded opening 12 at one side for receiving one end of a valve assembly 14. The valve assembly 14 has threads 16 which screw into the opening 12.

The valve assembly 14 has a reduced-diameter extension 18 which constitutes the end which fits into the opening 12 and this extension 18 has a cylindrical end portion 20 which fits into a smooth bore along part of the opening 12 beyond the threads 16. An O-ring 22, in a circumferential groove in the extension 18, seals the structure against leakage of fluid between the cylindrical end portion 20 and the cylindrical wall of the opening 12.

A cylindrical counterbore 26 in the end face of the extension 18 provides a bearing for an actuator element 28. There is a socket in the left-hand end of the element 12 for receiving one end of a slide valve 30. This socket in the actuator element 28 holds the right-hand end of the slide valve 30 in axial alignment with a cylindrical opening 34 through the main body of the valve assembly 14; and this opening 34 is coaxial with the counterbore 26.

There are sealing rings, preferably O-rings 36 and 38, located in circumferential grooves in the wall of the cylindrical opening 34, at axially spaced locations along this opening 34. At least the portion of the opening 34 to the left of the O-ring 36 serves as a bearing for the slide valve 30. The diameter of the opening 34 to the right of the O-ring 36 may also serve as a bearing and rely upon the running clearance for the flow of fluid; but in order to increase the cross sectional area for the flow of fluid, the diameter of the opening 34 to the right of the O-ring 36 is preferably larger than the diameter of the slide valve 30, since this space between the slide valve and the wall of the opening 34 constitutes part of the flow passage for fluid through the valve assembly.

There is an axially extending passage 42 throughout a substantial part of the length of the slide valve 30. This passage 42 opens through the left-hand end of the slide valve 30. Toward the other end of the passage 42 there are radially extending ports 44 which open through the circumference of the slide valve 30 and which communicate with the passage 42. In the preferred construction, these ports 44 are of uniform diameter throughout their length, and there is preferably no groove in the circumference of the slide valve 30 at the outer ends of the ports 44.

All of the ports 44 are in the same plane, normal to the longitudinal axis of the slide valve 30, and all of these ports 44 are of the same diameter.

The valve element 30 is of substantial length so as to provide a stem for supporting a diaphragm plate 48 having a hub 50 which fits tightly on the slide valve 30. A diaphragm 52 is attached to the plate 48 and this diaphragm 52 has a circumferential bead 54 which snaps into a groove 56 extending around the main body of the valve assembly 14. The diaphragm 52 can be made of rubber or any other elastomer having sufficient flexibility to be shaped to the folds illustrated in the drawing, or to other corrugated contour which permits a substantial axial movement of the diaphragm plate 48 and the slide valve 30.

A shell 58 fits over the main body of the valve assembly 14 and is held in place by angularly spaced screws around the circumference of the shell. The shell 58 has an inside diameter substantially equal to the maximum diameter of the main body of the valve assembly 14 and it is sealed against leakage by a sealing ring 62 located in a groove around the main body of the valve assembly. The closed end of the shell 58 is spaced from the diaphragm 52 so as to provide a chamber 66 for holding fluid under pressure. A conical coil spring 68 is clamped between the diaphragm 52 and the closed end of the shell 58.

The valve assembly 14 has a shoulder 70 which confronts the face of the housing 10 that surrounds the opening 12. There are grooves in the shoulder 70 which holds O-rings 72 and 74 which seal a clearance 76 between the shoulder 70 and the end face of the housing 10.

The clearance 76 extends all around the opening 12 and it communicates with the chamber 66 through a bleed passage 80. The clearance 76 also communicates, through another passage 82, with an outlet port 84 which can be connected to a hose or tubing leading to a pressure-operated actuator for a valve which is to be controlled at a remote location.

Fluid under pressure is supplied to the clearance around the slide valve 30 between the O-rings 36 and 38. This fluid flows to this clearance through a passage 86 in the valve assembly and a passage 88 in the housing 10. This latter passage 88 communicates with an inlet port 90.

The slide valve 30 is normally held in the position shown in FIGURE 1 by the force of the spring 68. There is a manually actuated handle 92 held in a resilient bushing 94 which serves as a fulcrum. This bushing 94 has a circumferential groove 96 with a rounded contour for facilitating rocking movement of the handle 92 in the bushing 94 as a fulcrum bearing. The bushing 94 is held in a fitting 98 which screws into an opening in the top of the housing 10.

An opening 100 through the fitting 98 is of substantially larger diameter than the handle 92 so that the handle 92 has substantial angular movement about the fulcrum bushing 94 without striking the sides of the opening 100.

Clockwise rocking movement of the handle 92 in the bushing 94 displaces the actuator 28 toward the left in FIGURE 1 and moves the slide valve 30 and diaphragm 52 toward the left. As this movement continues, the ports 44 are moved from the position shown in FIGURE 1 to the other side of the O-ring 38, as shown in FIGURE 5. Fluid under pressure from the passage 86 flows through the clearance between the valve 30 and the opening 34 and through the radial ports 44 into the axially extending passage 42 in the slide valve.

Referring again to FIGURE 1, it will be evident that fluid flowing from the passage 42 into the chamber 66 exerts a force against the diaphragm 52. This force is transmitted through the diaphragm plate 48 to the slide valve 30, and through the slide valve 30 to the actuator element 28 and back to the handle 92 so that an operator holding the handle is conscious of the pressure in the chamber 66 and can feel the pressure of the fluid when the slide valve has been moved far enough to pressurize the chamber 66. The fluid in the chamber 66 escapes through the bleed passage 80 into the clearance 76 and then flows through the passage 82 and outlet port 84 to the servo motor or other apparatus to which pressurized fluid is to be supplied by the controller shown in FIGURE 1.

The controller has a similar valve assembly 14' on the other side of the housing 10 and the construction is similar to that already described but the valve assembly 14' controls flow of fluid into an outlet port 84' in response to rocking of the handle 92 in the opposite direction to that which moves the slide valve 30' into position to supply pressurized fluid to its outlet port 84'.

FIGURE 4 is an enlarged view showing the slide valve 30 in the same position as in FIGURE 1 but illustrating the way in which fluid can escape from the chamber in the end of the slide valve 30 through the passage 42 and radial ports 44 into the clearance around the slide valve 30 on the right-hand side of the O-ring 38. This clearance vents to the atmosphere (FIGURE 1) and around the working clearance of the handle 92 or any vent outlet if the clearances are not sufficient for the desired rate of pressure reduction. The space on the right-hand side of the diaphragm 52 is vented through a passage 106 which also communicates with the vent passage 104. The pressure in the passages 104 and 106 is substantially atmospheric at all times.

The diameter of the radial ports 44 is preferably less than the span of the O-ring 38 so that the O-ring closes these ports 44 when they are located centrally under the O-ring 38. This means that the diameter of the ports 44 must be substantially less than the diameter of the O-rings 38 and not greater than the chord of the O-ring which will contact with the edge of each opening 44, bearing in mind that the O-ring contacts with the full-diameter portion of the slide valve 30 between the radial ports 44. Although ports of larger diameter can be used if there is a shallow groove around the slide valve and into which the ports open, this is unnecessary in order to provide ports of adequate diameter and is objectionable because it requires more force to move the slide valve. It is a feature of the invention that the necessary cross-section for fluid flow is obtained by providing a plurality of ports 44 opening through the circumference of the slide valve 30 and of small enough diameter so that no circumferential groove need be provided. Some features of the invention can be used in constructions where a grooved slide valve is employed.

In the construction shown in FIGURES 1–5, the O-ring 38 is subjected to a radial squeeze. The squeeze is light so as to reduce friction and so as to prevent the O-ring from being displaced excessively into the ends of the ports 44.

FIGURE 6 shows a modified construction in which there is no radial pressure for squeezing an O-ring 38a. This O-ring 38a is located in a grove 38b which leaves clearance around the outside of the O-ring; but the undistorted inside diameter of the O-ring 38a is slightly less than the outside diameter of the slide valve 30a so that the O-ring 38a is stretched somewhat when placed over the slide valve and it hugs the slide valve in a manner similar to an O-ring which is subject to a radial squeeze. The O-ring 38a shown in FIGURE 6 is also provided with a limited axial rolling movement. This introduces some lost motion into the action of the slide valve and requires a slightly longer stroke, but it permits more rolling movement of the O-ring and distribution of wear.

The preferred embodiments of the invention have been illustrated and described, and the invention is defined in the appended claims.

What is claimed is:

1. A slide valve assembly comprising a cylindrical stem having an axially extending passage therein, a port opening through the circumference of the stem and connecting with the axially extending passage, a sealing ring surrounding the stem, the ring and stem having relative axial movement to locate the port selectively in a first position on one side of the ring where the passage in the stem connects through the port with a clearance surrounding the stem, and to locate the port in another position where the ring seals the port from said clearance, a pressure sensing chamber to which fluid under pressure is supplied when the stem is in said first position, a movable wall of the pressure sensing chamber for moving the stem toward said other position when pressure is supplied to said chamber, and an actuator for moving the stem into said first position.

2. The slide valve described in claim 1 characterized by a plurality of ports at axially spaced locations around the circumference of the stem and opening through said circumference in a plane normal to the longitudinal axis of the stem, the ring having a surface in contact with the stem at least as great as the width of the ports as measured in an axial direction where the ports open through the circumference of the stem, and the stem having movement relative to the ring surface to locate the ports selectively under the ring and on one side of the ring or the other.

3. The slide valve described in claim 1 characterized by a housing having a generally cylindrical longitudinal guide through which the stem extends, a portion of the wall of the guide being a bearing in which the stem slides, a second sealing ring surrounding the stem, the sealing rings being in the guide and sealing the clearance between the stem and the walls of the guide, said rings being axially spaced from one another and the stem having a clearance from the wall of the guide along the length of the guide between the rings whereby said clearance provides a chamber surrounding the stem, a passage for the flow of fluid between said chamber and a location outside of the housing.

4. The slide valve described in claim 3 characterized by grooves in the wall of the guide in which sealing rings are heald, each of the sealing rings being an O-ring and being distorted by pressure against the stem, the ring across which the ports of the stem move being distorted to an axial width at least as great as the axial width of the openings through the circumference of the stem whereby the ring closes the ports when centered over them.

5. The slide valve described in claim 4 characterized by the passage for the flow of fluid to the chamber between the O-rings communicating with an inlet port of the housing for supplying of fluid under pressure to said chamber, and a passage for venting the space around the valve stem on the other sides of the rings.

6. A slide valve comprising a cylindrical stem having an axially extending passage therein, a port opening through the circumference of the stem and connecting with the axially extending passage, a sealing ring surrounding the stem, and means for producing relative axial movement of the ring and stem to locate the port selectively on one side of the ring where the passage in the stem connects through the port with a clearance surrounding the stem, and to locate the port in another position where the ring seals the port from said clearance, and characterized by a housing having a generally cylindrical longitudinal guide through which the stem extends, a portion of the wall of the guide being a bearing in which the stem slides, a second sealing ring surrounding the stem, the sealing rings being in the guide and sealing the clearance between the stem and the walls of the guide, said rings being axially spaced from one another and the stem having a clearance from the wall of the guide along the length of the guide between the rings whereby said clearance provides a chamber surrounding the stem, a passage for the flow of fluid between said chamber and a location outside of the housing, and further characterized by the housing having a sensing pressure chamber with a movable wall that is connected with the stem for movement with the stem, the axially extending opening in the stem extending through one end of the stem and opening into the sensing pressure chamber, and operator-actuating means for moving the stem against fluid pressure in the pressure sensing chamber and into position to move the port into a location where it communicates with the clearance between the guide and the surface of the stem between the sealing rings.

7. The slide valve described in claim 6 characterized by the operator-actuating means being a lever, the movable wall having a bias that urges the valve stem into position to locate the port on the side of the first sealing ring remote from the chamber provided by the clearance around the stem between the sealing rings, whereby the stem moves into position to shut off communication between said clearance and the pressure sealing chamber whenever force against the operator-actuating means is released.

8. The slide valve described in claim 7 characterized by a bleed passage from the pressure sensing chamber communicating with an outlet port of the housing.

9. The slide valve described in claim 8 characterized by the housing including a block having an opening in one side thereof, and including also a valve assembly that comprises the valve stem, guide, sealing rings, and pressure sensing chamber with the movable wall, means detachably connecting the valve assembly with the block, an inlet port for the passage between the chamber and the outside of the housing and the outlet port being in the block and communicating with the valve assembly through annular chambers formed by confronting faces of the block and valve assembly when connecting with one another, and the operator-actuating means comprising a lever and a fulcrum bearing in the block and on which the lever rocks to displace the valve stem toward the pressure sensing chamber.

10. The slide valve described in claim 9 characterized by there being similar valve assemblies at opposite sides of the block, and motion-transmitting means by which the lever actuates one of the valve assemblies when rocked in one direction and the other of the valve assemblies when rocked in the other direction.

References Cited

UNITED STATES PATENTS

| | | | |
|---|---|---|---|
| 2,466,795 | 4/1949 | Crot | 137—636.1 |
| 3,073,619 | 1/1963 | Manning | 137—627.5 X |
| 3,076,476 | 2/1963 | Campbell | 137—625.68 |
| 3,140,728 | 7/1964 | Webb | 137—625.69 |
| 3,191,626 | 6/1965 | Leibfritz | 137—625.69 |
| 3,330,294 | 7/1967 | Manning | 137—625.38 X |

CLARENCE R. GORDON, Primary Examiner

U.S. Cl. X.R.

137—625.68, 596, 609, 612.1, 636